(12) United States Patent
Mayer

(10) Patent No.: US 9,546,771 B2
(45) Date of Patent: Jan. 17, 2017

(54) PACKED PILLOW OPTIC ARRAY

(71) Applicant: GE LIGHTING SOLUTIONS, LLC, East Cleveland, OH (US)

(72) Inventor: Mark J. Mayer, Sagamore Hills, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 141 days.

(21) Appl. No.: 13/975,490

(22) Filed: Aug. 26, 2013

(65) Prior Publication Data

US 2015/0055349 A1    Feb. 26, 2015

(51) Int. Cl.
| | |
|---|---|
| *F21V 5/04* | (2006.01) |
| *G02B 3/00* | (2006.01) |
| *G02B 6/08* | (2006.01) |

(52) U.S. Cl.
CPC . *F21V 5/04* (2013.01); *F21K 9/60* (2016.08); *G02B 3/0056* (2013.01); *G02B 3/0068* (2013.01); *G02B 6/08* (2013.01)

(58) Field of Classification Search
CPC F21V 29/2293; F21V 29/027; F21V 29/2206; F21V 19/0055; F21V 23/005; F21K 9/1355; F21K 9/90; F21Y 2101/02
See application file for complete search history.

(56) References Cited

U.S. PATENT DOCUMENTS

| | | | |
|---|---|---|---|
| 3,615,313 A | 10/1971 | Phaneuf | |
| 6,414,801 B1 | 7/2002 | Roller | |
| 6,717,735 B2 | 4/2004 | Smith | |
| 7,092,070 B2 | 8/2006 | McCullough et al. | |
| 7,407,798 B2 | 8/2008 | Oldham et al. | |
| 7,484,871 B2 | 2/2009 | Boxler | |
| 7,490,954 B2 | 2/2009 | Mayer et al. | |
| 2005/0152044 A1 | 7/2005 | Tang | |
| 2006/0202125 A1 | 9/2006 | Suhami | |

FOREIGN PATENT DOCUMENTS

WO    9936830 A2    7/1999

OTHER PUBLICATIONS

PCT Search Report and Written Opinion issued in connection with corresponding WO Application No. PCT/US2014/049559 dated Nov. 17, 2014.
C.T. Pan, M.F. Chen, P.J. Cheng: "Fabrication of gapless dual-curvature microlens as a diffuser for a LED package". Sensors and Actuators A: Physical, vol. 150, Issue 1, Mar. 16, 2009, pp. 156-167.

*Primary Examiner* — Britt D Hanley
(74) *Attorney, Agent, or Firm* — GE Global Patent Operation; Peter T. DiMauro

(57) ABSTRACT

A pillow optic array comprising a plurality of first order pillow optic elements arranged as a two-dimensional grid with a plurality of interstice spaces between adjacent first order pillow optic elements. Each of a plurality of second order pillow optic elements, located within respective interstice spaces. Pillow optic elements of the second order have a predetermined dimension that is less than a predetermined dimension for pillow optic elements of the first order. A ratio of a cross-sectional width of pillow optic elements to a cross-sectional height of pillow optic element is the same proportion for each order of pillow optic elements in the pillow optic array, the cross-sectional width being located in a plane along the pillow optic array and the cross-sectional height located in a plane vertical to the pillow optic array. The higher order pillow optic elements touching, about tangentially, a lower order pillow optic element.

20 Claims, 14 Drawing Sheets

First order

Second order

Third order

Fourth order

Fifth order

Sixth order

PACKED PILLOW OPTIC ARRAY

BACKGROUND

An optical designer is often times faced with the challenge of designing an optic that receives near collimated light rays from a Fresnel lens or parabolic reflector and creating a diffuse beam that has a precisely diverging beam while maintaining a round beam shape. An efficiency requirement is specified for the output beam.

Conventionally, concave or convex spherical impressions can be milled or machined by electronic discharge into the face of an injection mold tool. Depending on the pattern of the impressions the resultant beam pattern might vary from square, diamond or hexagonal shapes. Alternatively, to create a round beam shape the designer could settle for a substantial amount of non-diffused collimated light in the resultant optical pattern. Other approaches use sandblasted, chemical and/or laser etched holographic surfaces to obtain a round beam pattern. These conventional approaches can have low efficiencies caused by over-scattering the light rays, or come at a premium cost (e.g., holographic surfaces).

BRIEF DESCRIPTION

In accordance with embodiments, a packed pillow optic array includes a plurality of first order pillow optic elements having a first predetermined dimension, the plurality of first order pillow optic elements arranged as a two-dimensional grid, where the adjacent first order pillow optic elements touch about tangentially. Between the adjacent first order pillow optic elements are a plurality of interstice spaces, within the plurality of interstice spaces are located a plurality of second order pillow optic elements, each of the plurality of second order pillow optic elements having a second predetermined dimension, at least one respective elements of the plurality of second order pillow optic elements located within respective ones of the plurality of interstice spaces, and the second predetermined dimension being less than the first predetermined dimension. A packed pillow optic array in accordance with embodiments can be incorporated into a lamp having a lamp base and a light source emitter located between the lamp base and the packed pillow optic array.

DETAILED DESCRIPTION

In accordance with some embodiments, a lens provided with a first set of circular pillow optics on at least one surface has its interstice spaces (i.e., spaces without any pillow optics) packed with one or more sets of circular pillow optics of decreasing diameter.

Figure 1:
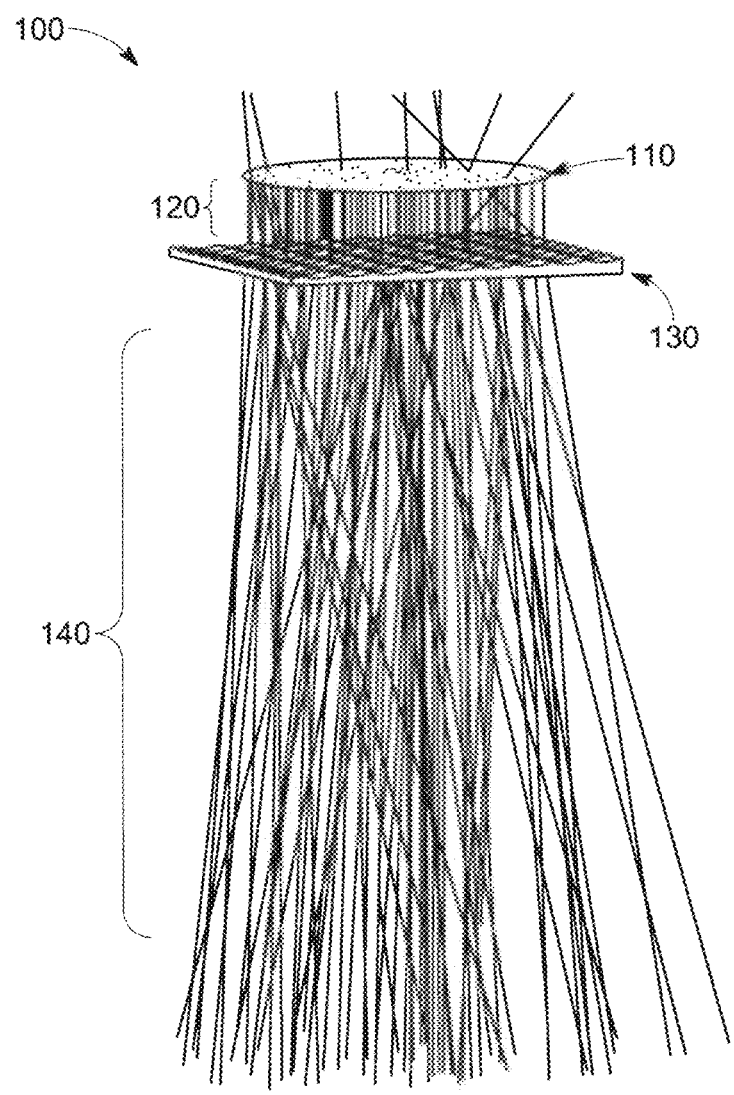
FIG. 1 depicts a light ray diagram representing an implementation in accordance with some embodiments.

FIG. 1 depicts a light ray diagram representing an implementation of a pillow optic lens element in accordance with an embodiment. Emitter 110 is a generic representation of a device that emits collimated light. The emitter receives light rays from a finite light source, and provides nearly collimated light rays 120. Emitter 110 can be any light source that can provide nearly collimated light rays for impingement upon the lens having a packed pillow optic array. For purposes of simulation, emitter 110 may be modeled as having zero thickness.

Emitter 110 can be for example, an optical system that consists of a light source (lamp, LED, or LED array) emitting light which can reflect off of a parabolic reflector, or refract through a Fresnel lens to produce nearly collimated light 120. A diffuser (e.g., packed circle pillow optic lens in accordance with some embodiments) can be placed in the path of the nearly collimated light produced by emitter 110. For purposes of simulation, the diffuser could be modeled as a square object. The addition of a diffuser in front of an optical arrangement can re-disperse the nearly collimated light into a non-collimated and/or diffuse beam 140.

Figure 2A:
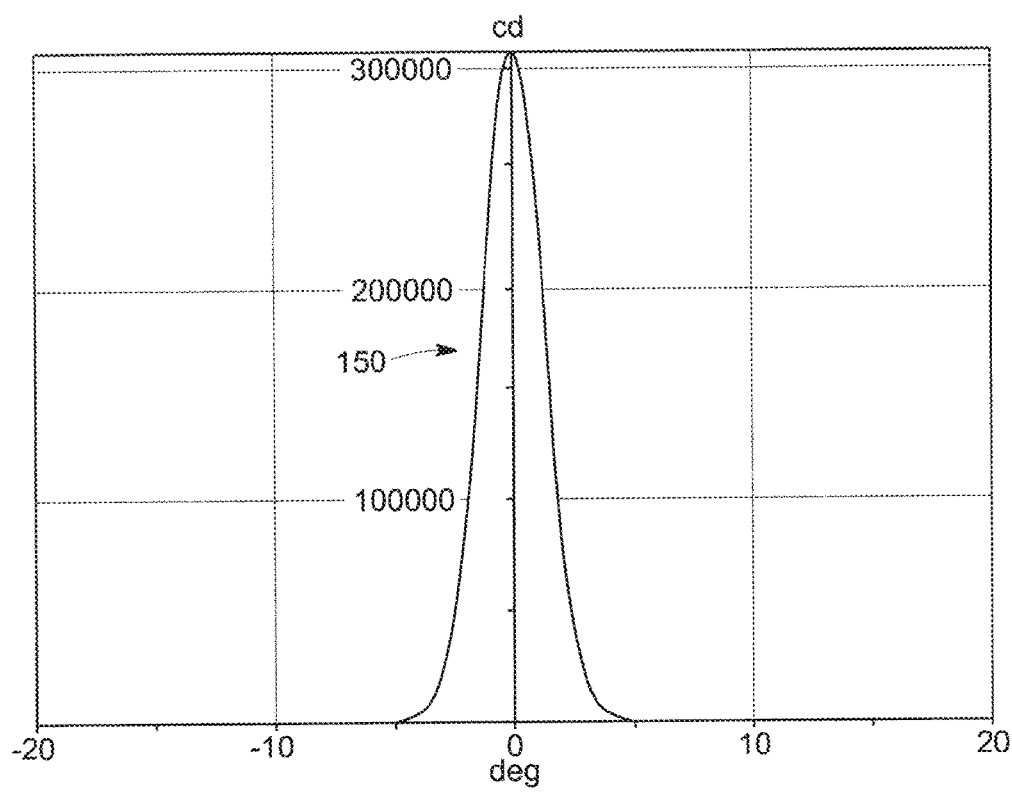
FIGS. 2A and 2B depict beam spread plots of a conventional beam spread pattern for a nearly collimated light ray source.
Figure 2B:
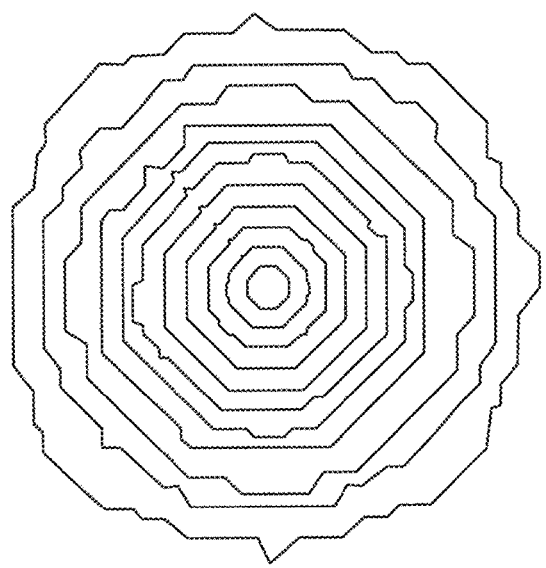

FIG. 2A depicts a two-dimensional, x-y rectangular plot of beam spread pattern 150 formed by nearly collimated light rays 120 (e.g., with only emitter 110 and no optic lens as diffuser 130) as a representation of an undiffused beam pattern. FIG. 2B depicts a polar plot of beam spread pattern 150 illustrating iso-lines of beam intensity. Both FIGS. 2A and 2B illustrate that beam spread pattern 150 is highly focused (i.e., the light is concentrated over a small angular region), and fairly symmetric about its axis of propagation.

Beam spread pattern 150 is an ideal pattern produced by nearly collimated light 120, and has a full width half maximum (FWHM) beam angle of 3 degrees in both azimuth and elevation planes. To simulate the properties of circle packing pillow optics in accordance with described embodiments, beam spread pattern 150 is modeled as being placed in the path of circle packing pillow optics embodiments so that the nearly collimated light is re-dispersed into a non-collimated or diffuse beam.

Figure 3:
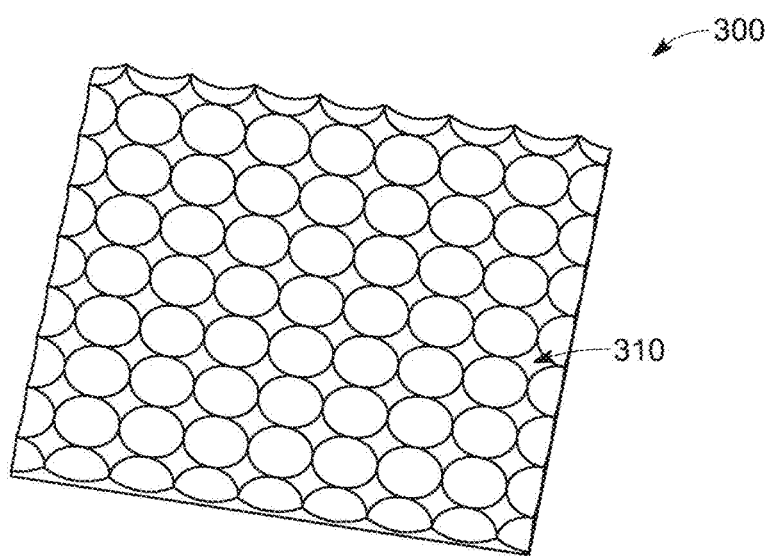
FIG. 3 depicts a conventional array of linear pillow optics without any overlap.
Figure 4A:
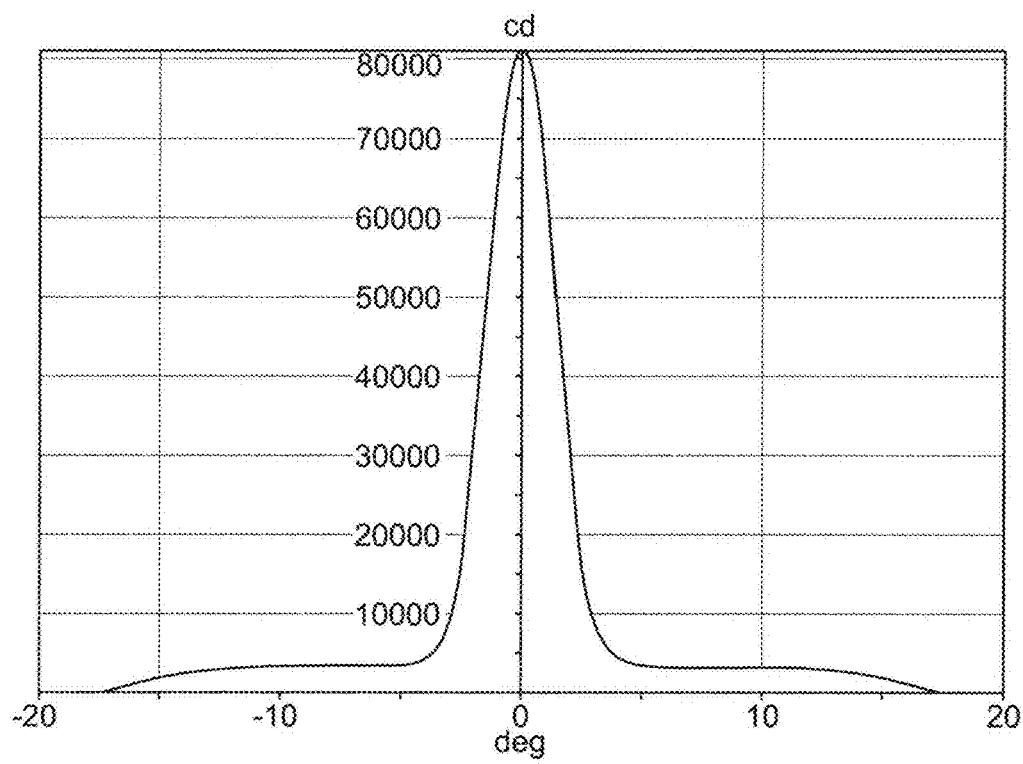
FIGS. 4A and 4B depict beam spread plots of the linear pillow optic array of FIG. 3.
Figure 4B:
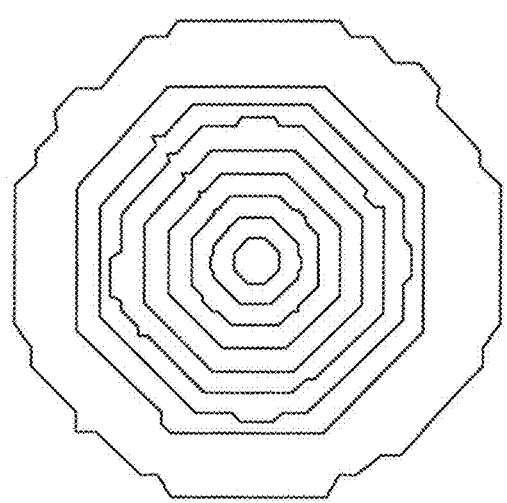

FIG. 3 depicts a conventional pillow optic array 300 arranged on a two-dimensional grid in rows and columns. Pillow optic array 300 has no overlap of optic elements. In one implementation, pillow optic array 300 is modeled as having 0.25 inch diameter concave pillow optics with 0.25 inch radius curvature as a base optic. Each pillow optic can be spherical, ellipsoid, parabolic, toroidal, or other geometric shape that can form a concave or convex shape with respect to the array surface. Modeling linear pillow optics 300 as the diffuser for nearly collimated light 120 rays results in the diffused beam depicted in FIGS. 4A and 4B. This diffused beam has a beam spread pattern with less intensity (peak power) than beam spread pattern 150, and with an elevated level at angles out to about ±15° from the beam axis. This reduction in peak power is due to the high intensity peak of beam spread pattern 150 being spread out across a larger angular region.

In one implementation, an ideal diffused beam pattern can have a light intensity distribution that is uniform over a broad angular region about the light propagation axis so as to form a round polar plot. This ideal diffused beam pattern is commonly referred to as a 'top hat' distribution. Although linear array 300 produces a diffused beam with elevated intensity, it still retains a high beam peak about the propagation axis. The high peak formed by linear pillow optic 300 is caused by the large amount (per unit area) of interstice space 310 surrounding the pillow optic elements. The light rays pass through interstice space 310 to collimate as the high center peak.

Figure 5:
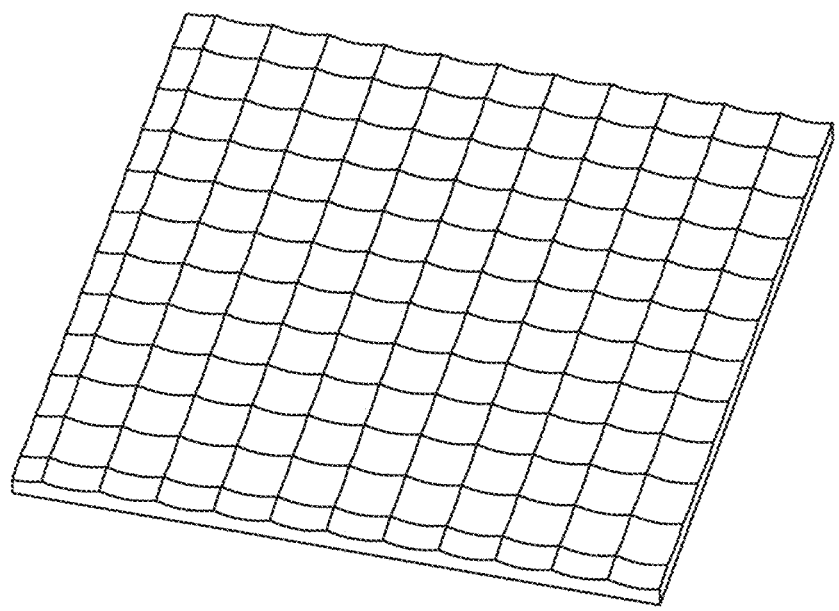
FIG. 5 depicts a conventional array of linear pillow optics with full overlap.
Figure 6A:
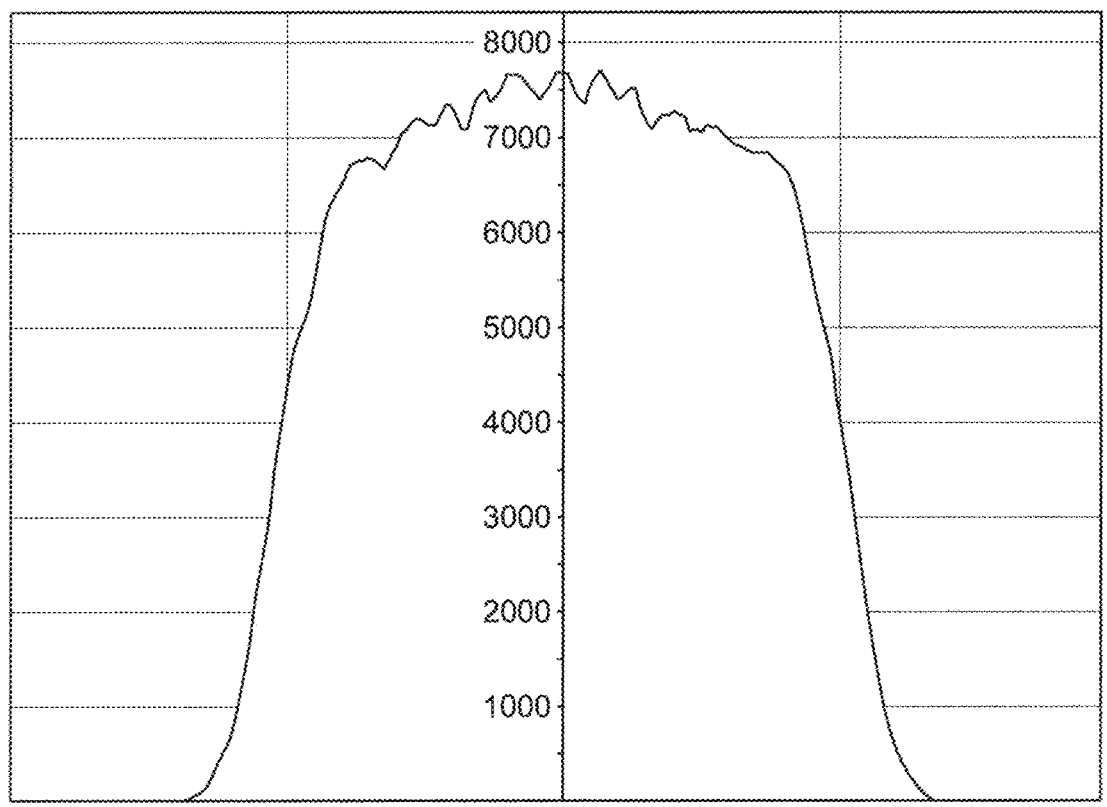
FIGS. 6A and 6B depict beam spread plots of the linear pillow optic array of FIG. 5.
Figure 6B:
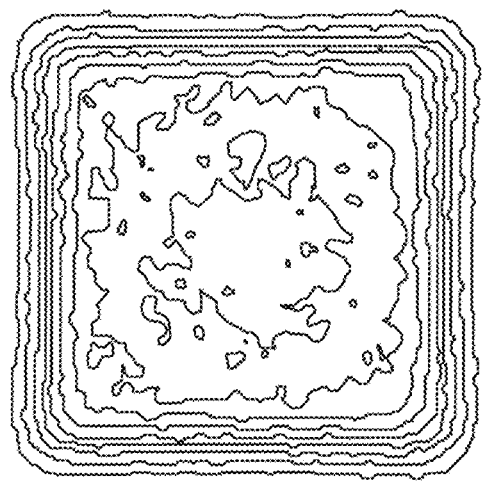

FIG. 5 depicts a conventional pillow optic array arranged on a two-dimensional grid in rows and columns. The pillow optic array of FIG. 5 has a full overlap of optic elements (i.e., a full density lens where there is ideally no interstice spaces between the optic elements). Because the circular elements are overlapping, each can be modeled as a square optic with a 0.25 inch length. Modeling a linear pillow optics array with full overlap as the diffuser for nearly collimated light 120 rays results in the diffused beam depicted in FIGS. 6A and 6B. This diffused beam has a beam spread pattern with about a 10% variation in level across a broad angular region, no discernible peak along a central axis, and a sharp drop-off. However, as can be seen in FIG. 6B, the beam spread pattern is not equally distributed about the axis of propagation, but is squared indicating a narrower beam pattern along the cardinal planes perpendicular to the axis of propagation.

Figure 7:
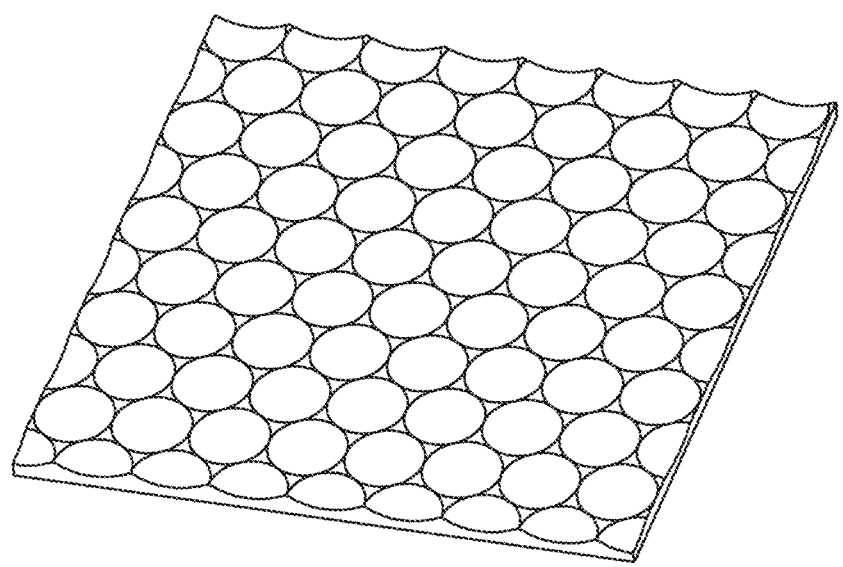
FIG. 7 depicts a conventional array of hexagonal pillow optics with no overlap.
Figure 8A:
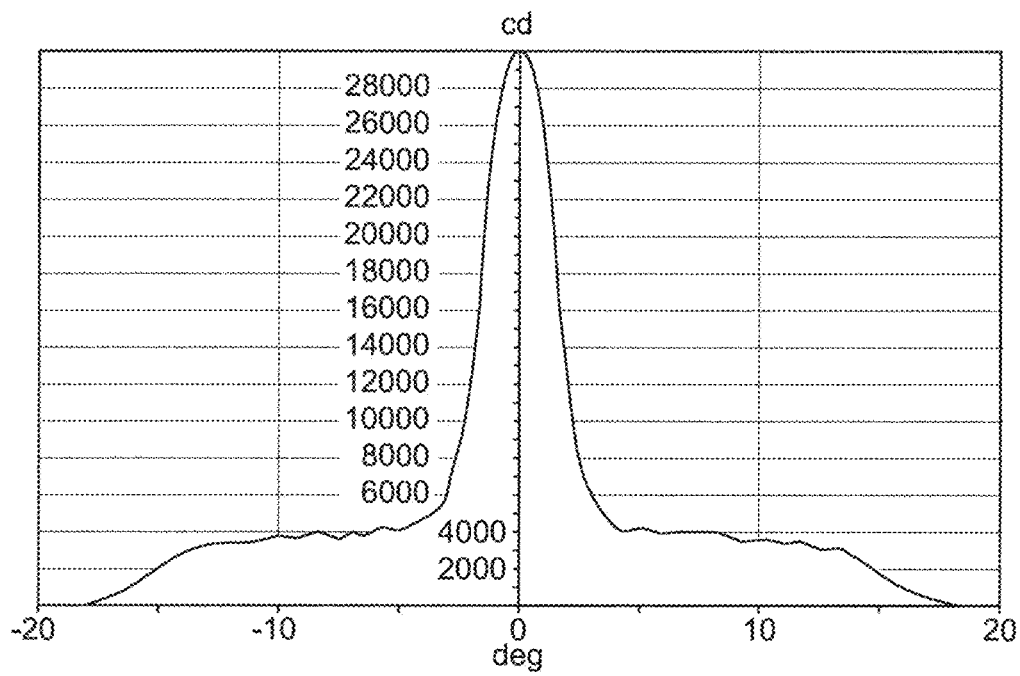
FIGS. 8A and 8B depict beam spread plots of the hexagonal pillow optic array of FIG. 7.
Figure 8B:
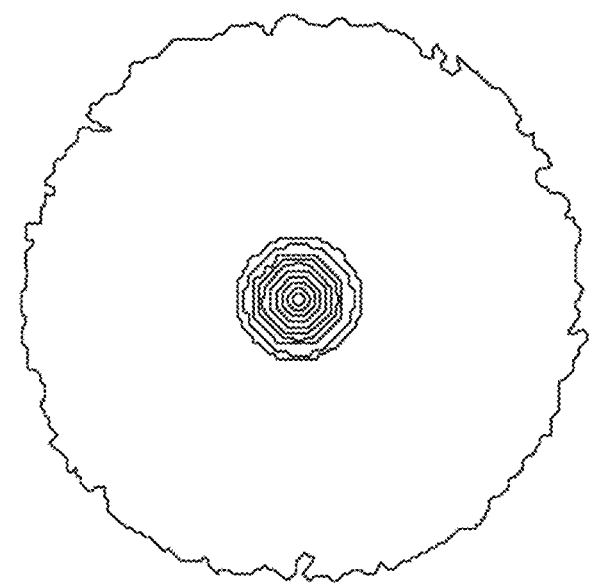

FIG. 7 depicts a conventional pillow optic hexagonal array arranged on a two-dimensional grid in rows and columns, where the centers of pillow optic elements in adjacent rows are offset so as to form a triangular grid. The pillow optic hexagonal array of FIG. 7 has no overlap of optic elements. The offset of the pillow optics results in less interstice space than the linear arrangement depicted in FIG. 3. Modeling this hexagonal array with no overlap as the diffuser for nearly collimated light 120 rays results in the diffused beam depicted in FIGS. 8A and 8B. This diffused beam has a beam spread pattern with high peak about the axis of propagation, and elevated levels at angles out to about ±17° from the beam axis. These elevated levels are higher than the elevated levels achieved by the rectangular grid depicted in FIG. 3. Additionally, the polar plot shown in FIG. 8B depicts a rounder, more uniform beam pattern distribution about the axis of propagation than the full overlap shown in FIG. 6B.

Figure 9:
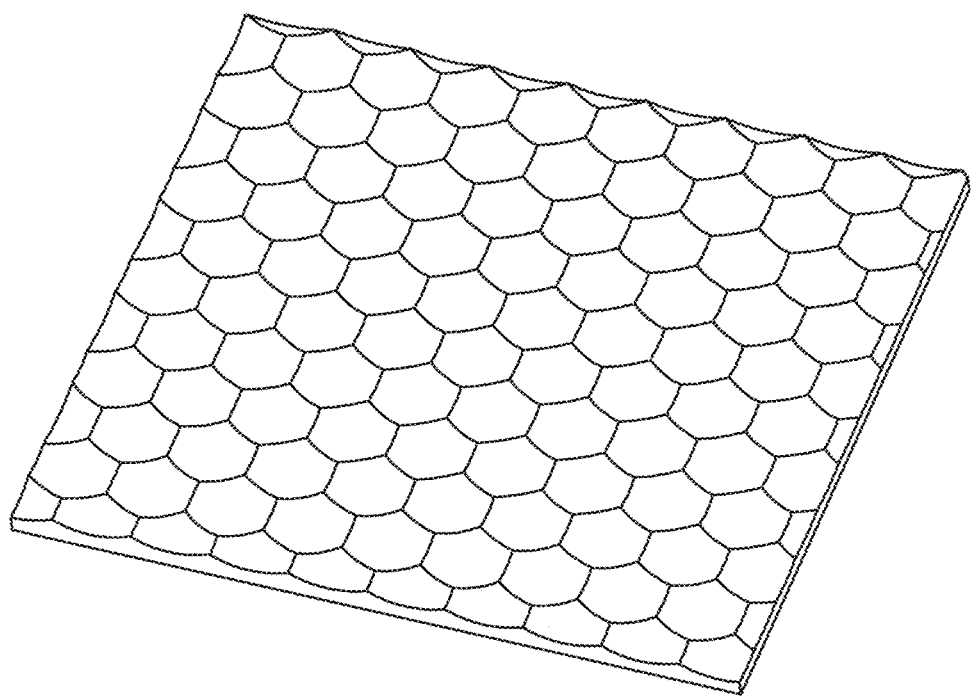
FIG. 9 depicts a conventional array of hexagonal pillow optics with full overlap.
Figure 10A:
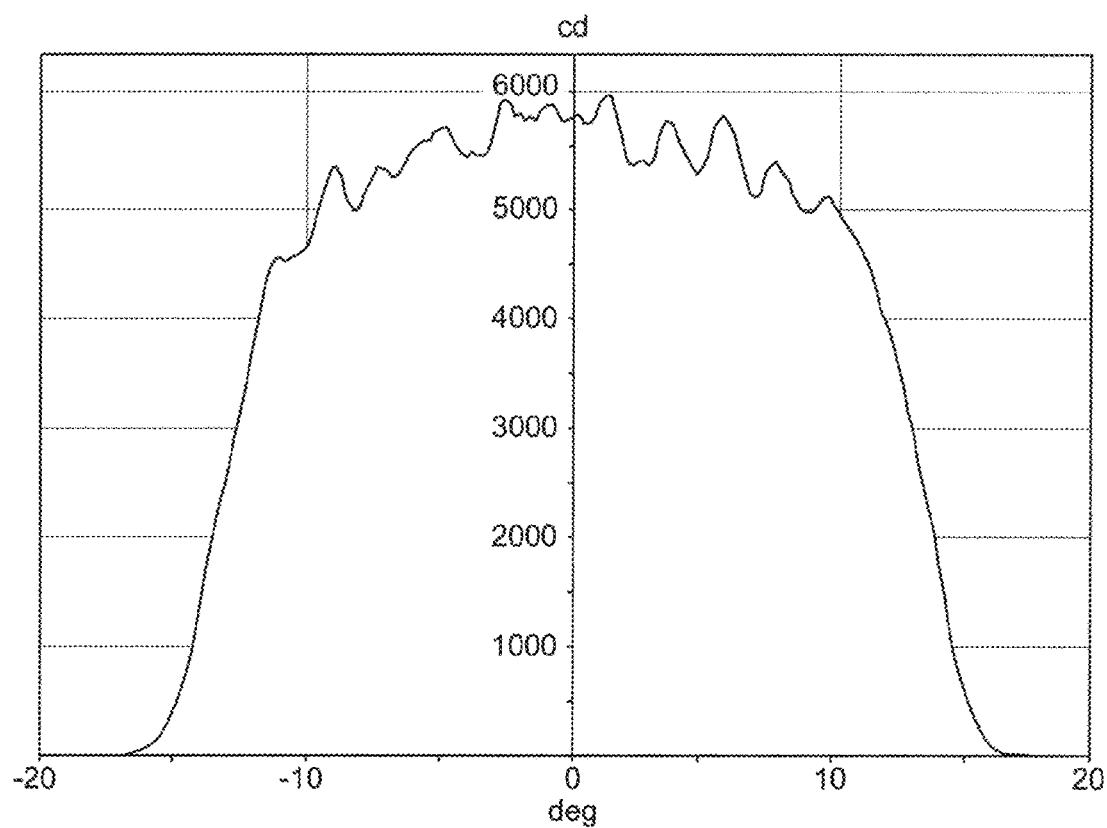
FIGS. 10A and 10B depict beam spread plots of the hexagonal pillow optic array of FIG. 9.
Figure 10B:
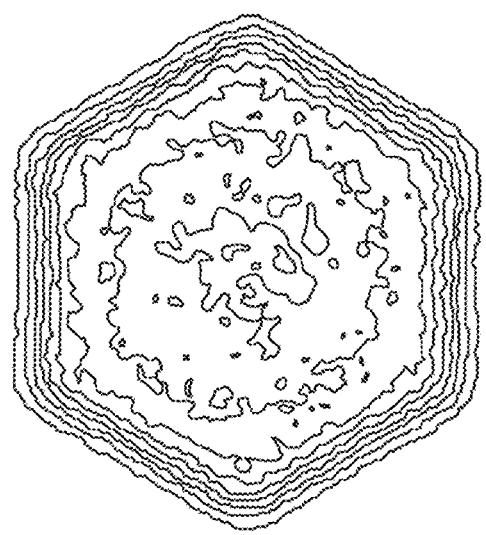

FIG. 9 depicts a conventional pillow optic hexagonal array with full overlap of optic elements. Because the circular pillow optics are staggered along a triangular grid, with full overlap the pillow optics can be modeled as a hexagonal shape having 0.2 inch lengths. Modeling this hexagonal array with full overlap as the diffuser for nearly collimated light 120 rays results in the diffused beam depicted in FIGS. 10A and 10B. This diffused beam has a beam spread pattern with about a 10% variation in level across a broad angular region. There is no discernible peak along its central axis, and the beam has a sharp drop-off. However, as can be seen in its polar plot (FIG. 10B), the beam spread pattern formed by the hexagonal pillow optic will full overlap is not an equally distributed beam pattern about the axis of propagation. Rather the beam pattern is hexagonal in shape about the propagation axis. Thus, the beam has a narrower beam pattern along the intercardinal planes perpendicular to the axis of propagation.

Figure 11A:
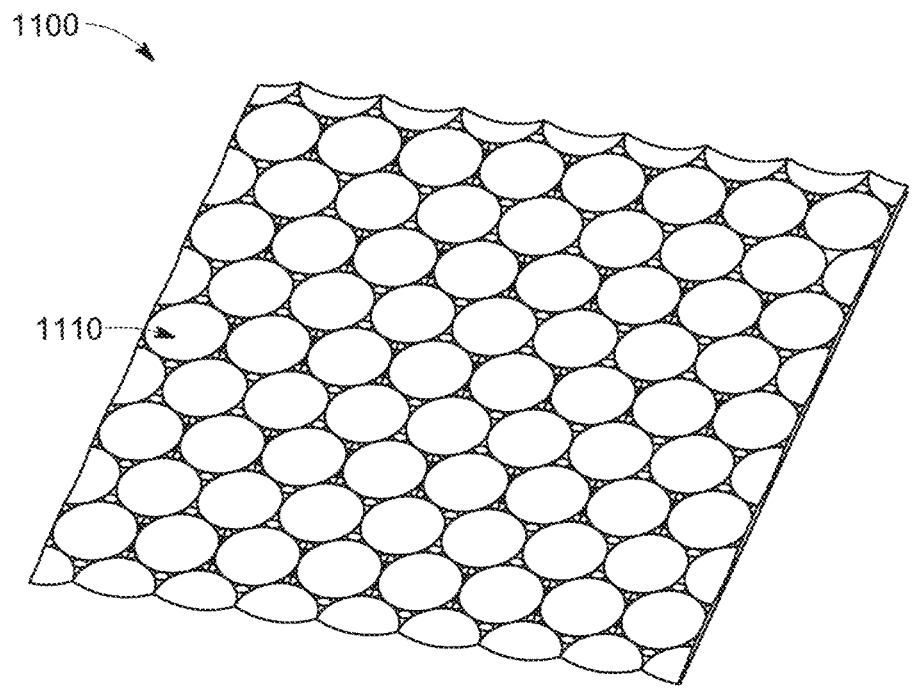
FIG. 11A depicts a hexagonal pillow optic array with circle packing in accordance with an embodiment.

FIG. 11A depicts hexagonal pillow optic array 1100 with circle packing arranged on a two-dimensional grid in rows and columns, in accordance with an embodiment. Hexagonal pillow optic array 1100 includes pillow optic elements 1110, which in some embodiments are circular in cross section along at least one plane. Each pillow optic can be spherical, ellipsoid, parabolic, toroidal, or other geometric shape that can form a concave or convex shape with respect to the array surface. In the depicted embodiment, the pillow optic elements are offset in adjacent rows so as to be arranged in a triangular grid. Other embodiments can include the pillow optic array arranged in a rectangular grid or other geometric orientations.

The optic array includes interstice space in areas between adjacent pillow optic elements. In some implementations, pillow optic elements 1110 touch, and/or nearly touch, adjacent optic elements about tangentially (i.e., within manufacturing capabilities and tolerances).

Figure 11B:
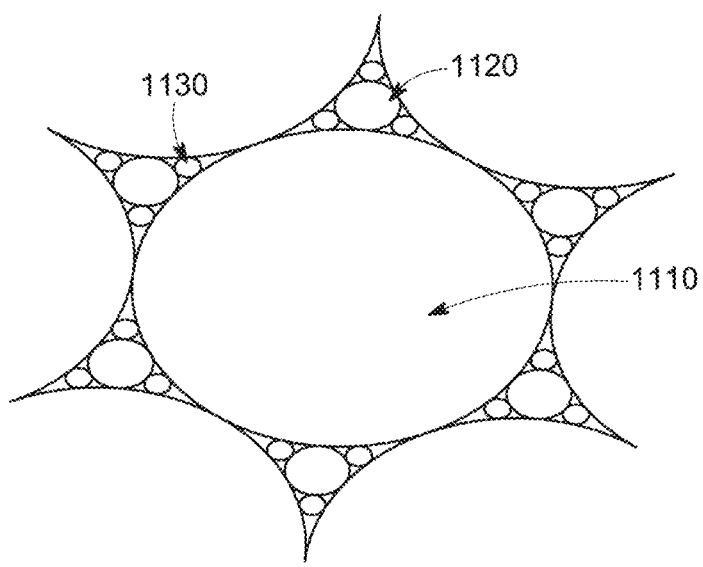
FIG. 11B depicts an exploded view of a portion of the hexagonal pillow optic array with circle packing of FIG. 11A.
Figure 12A:
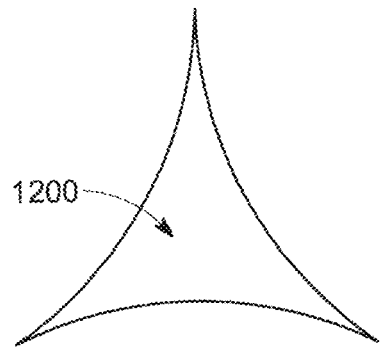
FIGS. 12A-12F depict elements of a hexagonal pillow optic array with various orders of circle packing in accordance with embodiments.
Figure 12B:
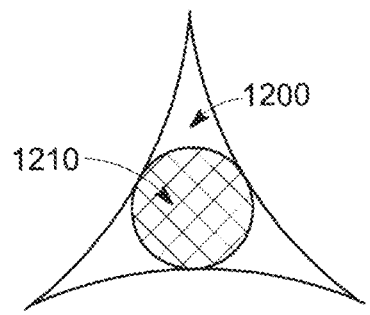
Figure 12C:
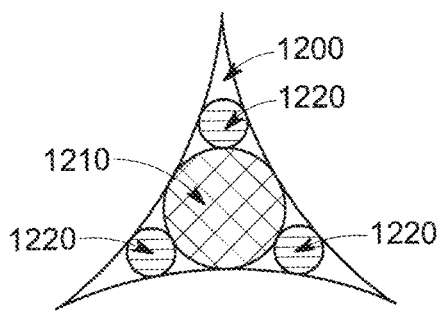
Figure 12D:
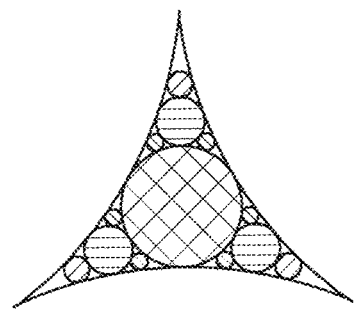
Figure 12E:
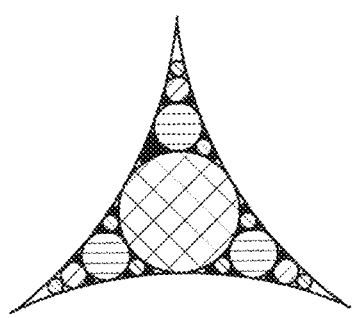
Figure 12F:
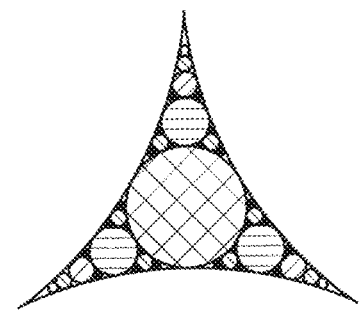

FIG. 11B is an exploded view of a portion of hexagonal pillow optic array 1100 in accordance with an embodiment. In accordance with this embodiment, in the interstice spaces between adjacent, about tangentially-touching pillow optic elements 1110 are two orders of additional pillow optics—second order optic elements 1120 and third order optic elements 1130. Other embodiments can include additional orders of additional optic elements in the interstice space. In accordance with some embodiments, these higher order (i.e., second, third, fourth, etc.) optic elements can be pillow optic elements.

In accordance with some embodiments, a single second order optic element 1120 is located within the interstice space. This second order optic element can touch, and/or nearly can touch, adjacent optic elements about tangentially (i.e., within manufacturing capabilities and tolerances). For example, for the triangular grid of pillow optic array 1100, second order optic element 1120 can touch, and/or nearly touch, each of the three pillow optic elements 1110 bordering the interstice space. Second order optic element 1120 has a cross section that is less than the cross section of the first order optic element (i.e., pillow optic element 1110).

Third order optic element 1130 has a cross section that is less than the cross section of second order optic element 1120. The third order optic element is located in a remaining portion of the interstice space, and can touch, and/or nearly touch, at least one of the pillow optic elements 1110 bordering the interstice space and the second order optic element located in the interstice space. Second order optic element 1120 has a cross section that is less than the cross section of the first order optic element (i.e., pillow optic element 1110).

In accordance with embodiments, pillow optic array with circle packing 1100 can include multiple orders of optic elements within the interstice space. These optic elements are non-overlapping. The more orders of optic elements located within the interstice space reduces the remaining amount of interstice space between the adjacent pillow optic elements 1110.

FIG. 12 depicts various orders of circle packed optical elements in accordance with embodiments. FIG. 12A depicts a first order optic element arrangement formed from circular cross section pillow optic elements. Adjacent rows of the array are offset so as to be arranged on a triangular grid, and interstice space 1200 is surrounded by three about tangentially-touching optic elements. This first order array (with no optic elements in the interstice space) is similar to the conventional array depicted in FIG. 7. FIG. 12B depicts the array shown in FIG. 12A with a second order circle pack optic element 1210 as described above. FIG. 12C depicts the third order circle pack optic element array with circle pack optic element 1210 and circle pack optic element 1220, as also described above. FIGS. 12D-12F depict higher order (e.g., respectively fourth, fifth, and sixth) circle pack optic element arrays.

Figure 13A:
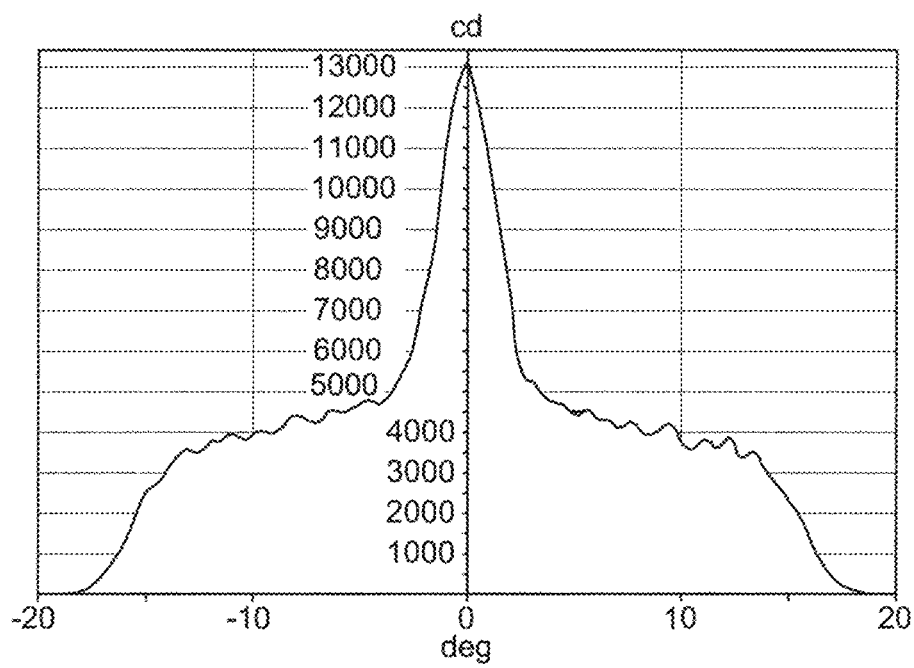
FIGS. 13A and 13B depict beam spread plots of a hexagonal pillow optic array with third order circle packing in accordance with an embodiment.
Figure 13B:
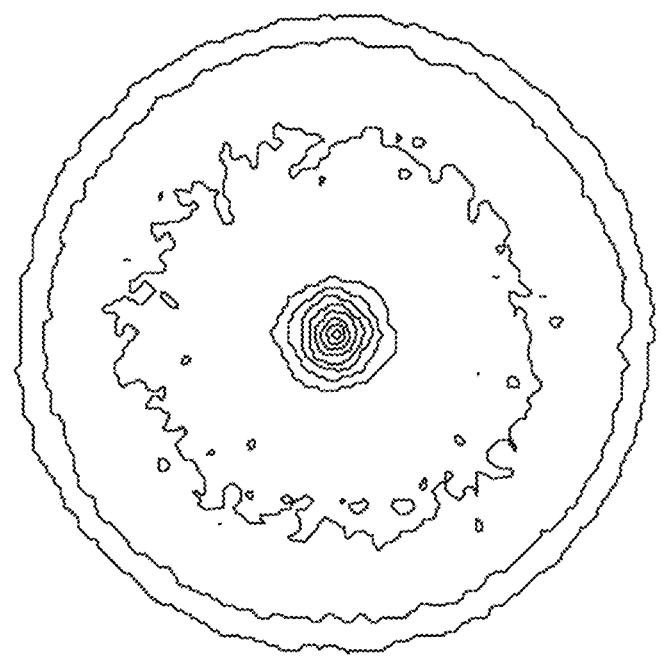

FIGS. 13A and 13B depict beam spread plots of a hexagonal pillow optic array with third order circle packing in accordance with an embodiment. The introduction of the second and third order circle packing into the array interstice space causes a much broader, and higher uniform level of light distribution. A comparison of FIGS. 13A-13B to FIGS. 8A-8B illustrate that the central beam of the pillow optic array with circle packing is narrower, the broad beam pattern is at a higher light intensity, and the shoulder drop-off is steeper with the circle packing in the interstice space.

Each order of optic element located in the interstice space can reduce the peak of the beam pattern, provide a more uniform distribution of power over a wider angular range, and form a more pronounced shoulder, or beam drop-off at the far-out angular region.

Figure 14:
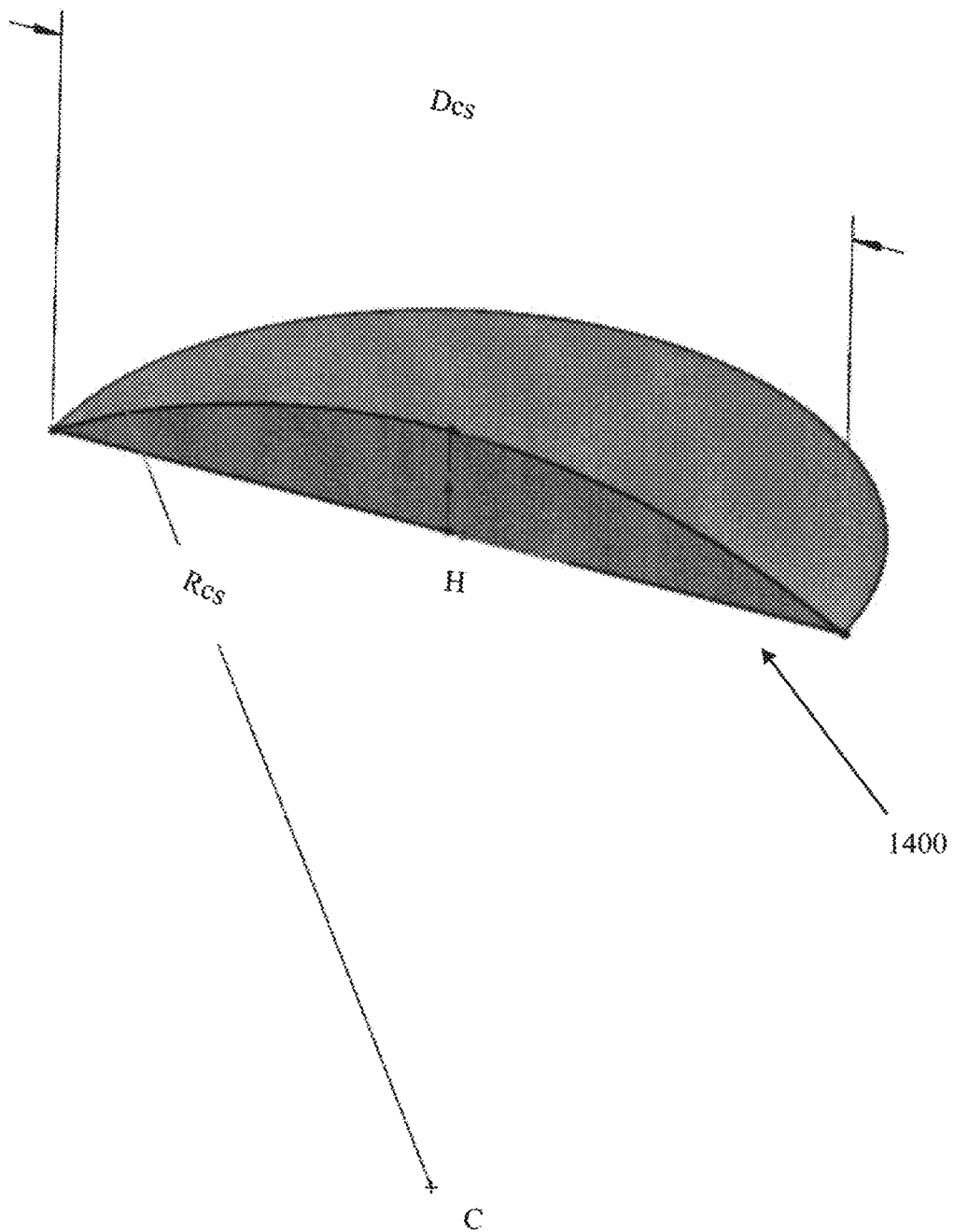
FIG. 14 is a cross-sectional view of a pillow optic element in accordance with an embodiment.

FIG. 14 is a cross-sectional view of pillow optic element 1400 in accordance with an embodiment. In accordance with certain embodiments having hemispherical pillow optics, the cross section width of pillow optic element 1400 within the same order is about (i.e., within manufacturing capabilities and tolerances) twice the cross section height of the pillow optic above the lens surface—i.e., Dcs=2h; where Dcs is the cross section width, and H is the cross section height of the pillow optic above the lens surface. Pillow optic element 1400, as depicted, is a portion of a sphere having its center at point C. In this example, the cross section radius Rcs of the sphere is 0.250 inches, the pillow optic cross section diameter Dcs equals 0.250 inches, and the cross section height H of the pillow optic element is 0.33 inches. In accordance with other embodiments, a pillow optic element which is a portion of a spherical geometric shape could have a diameter located in a plane along the pillow optic array surface that is less than twice the radius of the pillow optic along a plane vertical to the lens surface. Preserving the ratio between width and height among pillow optic elements within each order of pillow optic elements to be the same proportionate ratio provides the most uniform distribution in the beam spread pattern produced by the pillow optic array. As noted above, additional orders of pillow optic elements in the interstice space cause a greater impact towards a more uniform distribution.

The pillow optic elements of each order on a circle packed pillow optic array can be formed as protrusions from the surface of the lens, or in other implementations as depressions into the surface of the lens. The optic elements can be formed by such manufacturing techniques as periodic machining or by molding techniques.

For example, mold tools can be formed by periodic machining by perhaps a numerically controlled machine, or by burning away material from the mold using Electric Discharge Machining (EDM). Other techniques to produce a suitable mold are also acceptable. The mold can be shaped to form convex or concave lens elements above (or into) a surface of the lens material. The pillow optic array can be formed in a lens material that can be a clear material (e.g., plastic, glass, etc.). Plastic can be injected into a mold, and glass can be pressed into the mold to form the pillow optic array.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A pillow optic array comprising:
   a plurality of first order pillow optic elements having a first predetermined dimension;
   the plurality of first order pillow optic elements arranged as a two-dimensional grid, the adjacent first order pillow optic elements touching about tangentially;
   a plurality of interstice spaces, the plurality of interstice spaces located between adjacent first order pillow optic elements;
   a plurality of second order pillow optic elements, each of the plurality of second order pillow optic elements having a second predetermined dimension;
   at least one respective element of the plurality of second order pillow optic elements located within respective ones of the plurality of interstice spaces; and
   the second predetermined dimension being less than the first predetermined dimension;
   wherein a ratio of a cross-sectional width of pillow optic elements to a cross-sectional height of pillow optic element is the same proportion for each order of pillow optic elements in the pillow optic array, the cross-sectional width being located in a plane along the pillow optic array and the cross-sectional height located in a plane vertical to the pillow optic array.

2. The pillow optic array of claim 1, where adjacent rows of the pillow optic array are offset so as to form a triangular grid between centers of pillow optic elements in the adjacent rows.

3. The pillow optic array of claim 1, where the pillow optic elements have a circular cross section in at least one plane.

4. The pillow optic array of claim 3, wherein the pillow optic element is a portion of spherical pillow optic element.

5. The pillow optic array of claim 1, including the respective elements of the plurality of second order pillow optic elements touching about tangentially first order pillow optic elements adjacent to the respective ones of the plurality of interstice spaces.

6. A lamp comprising the pillow optic array of claim 1, the lamp including a lamp base located distal from the pillow optic array and a light source emitter located between the lamp base and the pillow optic array.

7. The lamp of claim 6, wherein the light source is one of a light emitting diode LED and an LED array.

8. A pillow optic array comprising:
a plurality of first order pillow optic elements having a first predetermined dimension;
the plurality of first order pillow optic elements arranged as a two-dimensional grid, the adjacent first order pillow optic elements touching about tangentially;
a plurality of interstice spaces, the plurality of interstice spaces located between adjacent first order pillow optic elements;
a plurality of second order pillow optic elements, each of the plurality of second order pillow optic elements having a second predetermined dimension;
at least one respective element of the plurality of second order pillow optic elements located within respective ones of the plurality of interstice spaces; and
the second predetermined dimension being less than the first predetermined dimension;
wherein the pillow optic array further includes:
a plurality of third order pillow optic elements, each of the plurality of third order pillow optic elements having a third predetermined dimension;
two or more respective elements of the plurality of third order pillow optic elements being located within respective ones of the plurality of interstice spaces adjacent to the respective elements of the plurality of second order pillow optic elements; and
the third predetermined dimension being less than the second predetermined dimension.

9. The pillow optic array of claim 8, wherein a ratio of a cross-sectional width of pillow optic elements to a cross-sectional height of pillow optic element is the same for each order of pillow optic elements in the pillow optic array, the cross-sectional width being located in a plane along the pillow optic array and the cross-sectional height located in a plane vertical to the pillow optic array.

10. The pillow optic array of claim 8, including the respective elements of the plurality of third order pillow optic elements touching about tangentially the respective second order pillow optic elements located in the respective ones of the plurality of interstice spaces.

11. The pillow optic array of claim 8, including:
one or more pluralities of higher order pillow optic elements, each of the pluralities of higher order pillow optic elements having a respective predetermined dimension;
two or more respective elements of the pluralities of higher order pillow optic elements being located within respective ones of the plurality of interstice spaces adjacent to respective elements of a plurality of lower order pillow optic elements; and
each of the respective predetermined dimensions being less than a predetermined dimension for each of the plurality of lower order pillow optic elements.

12. The pillow optic array of claim 11, wherein a ratio of a cross-sectional width of pillow optic elements to a cross-sectional height of pillow optic element is the same for each order of pillow optic elements in the pillow optic array, the cross-sectional width being located in a plane along the pillow optic array and the cross-sectional height located in a plane vertical to the pillow optic array.

13. The pillow optic array of claim 11, including the respective elements of the pluralities of higher order pillow optic elements touching about tangentially the respective lower order pillow optic element located in the respective ones of the plurality of interstice spaces.

14. A lamp comprising:
a pillow optic array lens, and a light source emitter, the pillow optic array lens comprising:
a plurality of first order pillow optic elements having a first predetermined dimension;
the plurality of first order pillow optic elements arranged as a two-dimensional grid, the adjacent first order pillow optic elements touching about tangentially, wherein each of the plurality of first order pillow optic elements comprises a geometric shape that is concave or convex with respect to a surface of the pillow optic array lens;
a plurality of interstice spaces, the plurality of interstice spaces located between adjacent first order pillow optic elements;
a plurality of second order pillow optic elements, each of the plurality of second order pillow optic elements having a second predetermined dimension;
at least one respective element of the plurality of second order pillow optic elements located within respective ones of the plurality of interstice spaces; and
the second predetermined dimension being less than the first predetermined dimension.

15. The lamp of claim 14, wherein a ratio of a cross-sectional width of pillow optic elements to a cross-sectional height of pillow optic element is the same proportion for each order of pillow optic elements in the pillow optic array lens, the cross-sectional width being located in a plane along the pillow optic array lens and the cross-sectional height located in a plane vertical to the pillow optic array lens.

16. The lamp of claim 14, where adjacent rows of the pillow optic array are offset so as to form a triangular grid between centers of pillow optic elements in the adjacent rows.

17. The lamp of claim 14, where the pillow optic elements have a circular cross section in at least one plane.

18. The lamp of claim 17, wherein the pillow optic element is a portion of spherical pillow optic element.

19. The lamp of claim 14, including the respective elements of the plurality of second order pillow optic elements touching about tangentially first order pillow optic elements adjacent to the respective ones of the plurality of interstice spaces.

20. The lamp of claim 14, wherein the light source is one of a light emitting diode LED and an LED array.

* * * * *